June 27, 1950 K. BORG 2,512,786

DRAFTING DEVICE

Filed Dec. 18, 1945 5 Sheets-Sheet 1

Kenneth Borg INVENTOR.

BY Stevens and Davis

ATTORNEYS

June 27, 1950 K. BORG 2,512,786

DRAFTING DEVICE

Filed Dec. 18, 1945 5 Sheets-Sheet 2

Kenneth Borg INVENTOR.

BY

Stevens and Davis ATTORNEYS

June 27, 1950 K. BORG 2,512,786

DRAFTING DEVICE

Filed Dec. 18, 1945 5 Sheets-Sheet 3

Kenneth Borg INVENTOR.

BY

Stevens and Davis

ATTORNEYS

Kenneth Borg INVENTOR.
BY
Stevens and Davis
ATTORNEYS

Kenneth Borg INVENTOR.

BY

Stevens and Davis
ATTORNEYS

Patented June 27, 1950 2,512,786

UNITED STATES PATENT OFFICE 2,512,786

DRAFTING DEVICE

Kenneth Borg, Salt Lake City, Utah

Application December 18, 1945, Serial No. 635,735

10 Claims. (Cl. 33—27)

My invention relates to trammels, more particularly to trammels used for impelling working tools, directing them along prescribed courses, and confining their work thereto as is required of working tools such as pencils, pens, pantographs, planimeters, cutters, brushes, engraving and etching tools used in the arts of drafting, engraving, etching and commercial artistry, and of the various working tools used in the processes of heavy industry, lofting, sheet metal work, gas torch cutting, and the like. As between models for different kinds of work, rather wide variations are required in size, strength, and detail of the parts of my mechanism to accomplish uniform excellence and desired range comparable with the variety of work it effectuates. For example, a gas-torch cutting model must be several times as large as a drafting or an engraving model. An engraving trammel is more sturdily built and is usually smaller than a drafting trammel, etc. Models of my mechanism, modes of attachment, impulsion, tool adapting and fastening of the mechanism itself are determined by the process being executed, the tool used, the nature of the material being processed, accuracy required, resistance to movement, speed, etc.; but, essentially the same kinematic relations obtain in all models as set out in the specification.

While my invention is adapted to all the uses above mentioned and more, the present disclosure by way of illustrating the principles involved will be devoted to a drafting trammel construction which I have used to accomplish all the drawings herewith submitted, and which is shown in Figure 1, attached to a scale on an ordinary drafting machine. In conjunction with such a drafting machine, and used as an attachment thereto, the present device is designed to utilize the constraining movements and features of such a drafting machine in addition to and beyond its own use.

The usual form of trammel, including curve drawing trammels, is adapted to describe ellipses; it either lies on the plane of description or is rigidly supported above that plane. Those types which lie on the plane of description are restricted either to drawing ellipses large enough to circumscribe their frame mechanisms or to the inherent obstacle of being obliged to draw half the ellipse at a time, and to center and orient the mechanism twice. Drafting trammels which are rigidly supported above the plane of the paper are super-sensitive to irregularities in that plane because of inadequate vertical freedom and can be centered over a given point, oriented, and fastened only by laborious means. As a practical matter these difficulties virtually preclude their use in the arts and industries above mentioned. My mechanism due to its three-point suspension feature allows adequate vertical freedom.

My mechanism is useful to describe any finite curve or portion of any infinite curve, and is intrinsically adapted to draw isomorphic families of finite curves large or small by making quick adjustments between each curve member drawn and without disturbing the centering or the orientation of the mechanism. Isomorphs of a curve type are achieved through quick adjustment; and changes of type are accomplished by changing one or both of two typing guide plates either through rotation, substitution, or inversion of the plates.

Attachment of my mechanism to an ordinary drafting machine,, T-square, parallel-line ruling machine, and the like,furnishes appropriate fastening and makes it unnecessary to puncture holes in the surface on which the machine stands, or to weight the mechanism to secure it in position. Being thus attached, my mechanism utilizes these other machines in drawing series of curves in rectilinear sequence, as for example: screw threads, chain links, and the like. This same sort of convenience arises in industrial processes by using my mechanism attached to a cross-head, or to a gauntry where repetition of curve description in rectilinear sequence is required as, for example, in cutting a series of holes in correct linear sequence in steel plate with a gas jet, or in angular and annular sequence when attached to a turntable.

The main object of my invention is to achieve economies by saving time, improving accuracy, and uniformity of product in the arts and industry by furnishing a machine which will carry and impel a working tool accurately along any prescribed course while the tool is working.

An important object of my invention is to exploit more fully the usefulness of other machines and appliances by adapting my mechanism to operate in combination with them as well as alone.

An object of my invention is to furnish a machine for educational purposes which will explicate the use and theory of the trammel by lending physical significance, interpretation, and perspicuity to the mathematical expose of the general plane curve as herein set out.

An object of my invention is to provide for use with my mechanism and to be sold as a separate accessory, curve typing guide plates designed for any particular use or trade and/or as required by specification.

An object of my invention is to achieve economies in working time by furnishing facilities within the mechanism itself for designing curve typing guide plates if desired at the site of the work, when the required path of the working tool is known.

Another object of my invention is to arrange its adjustments so that they can be made independently without disturbing the position of the machine and be read on graduated scales and limbs with verniers, and so that these readings represent the constants involved in the mathematical discussion herein set out; so that dimensions within any type of finite curve can be set off according to coefficients and a curve predetermined by those settings.

Another object of my invention is to furnish a machine essentially as described in these specifications which lends itself to the use of operators not trained in the higher mathematics.

Broadly described, my invention is a trammel which can impel a working tool along any prescribed plane locus and restrict its movement to that predetermined locus precisely.

The above and other advantages of my invention will be apparent in the detailed description which follows, and the accompanying drawings in which:

Figure 1 is a dimetric drawing of one form of my trammel attached to the scale on an ordinary drafting machine, by which combination of machines all the curves shown in the accompanying drawings were executed. The dimetric proportions of the axonometric drawings on Sheet 1 are (7° 10′—½″), (90°—½″), (41° 25′—¼″). I prefer a mechanism approximately this size and design for the use of engineering draftsmen;

Figures 9, 43:
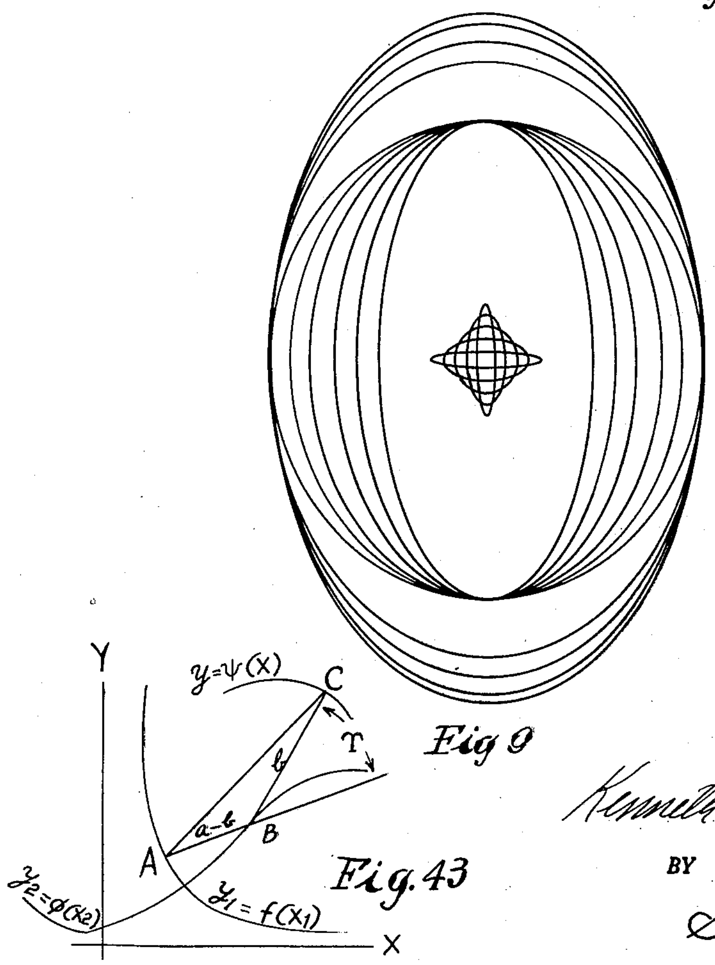
Figures 10, 11, 12, 13, 14, 15:
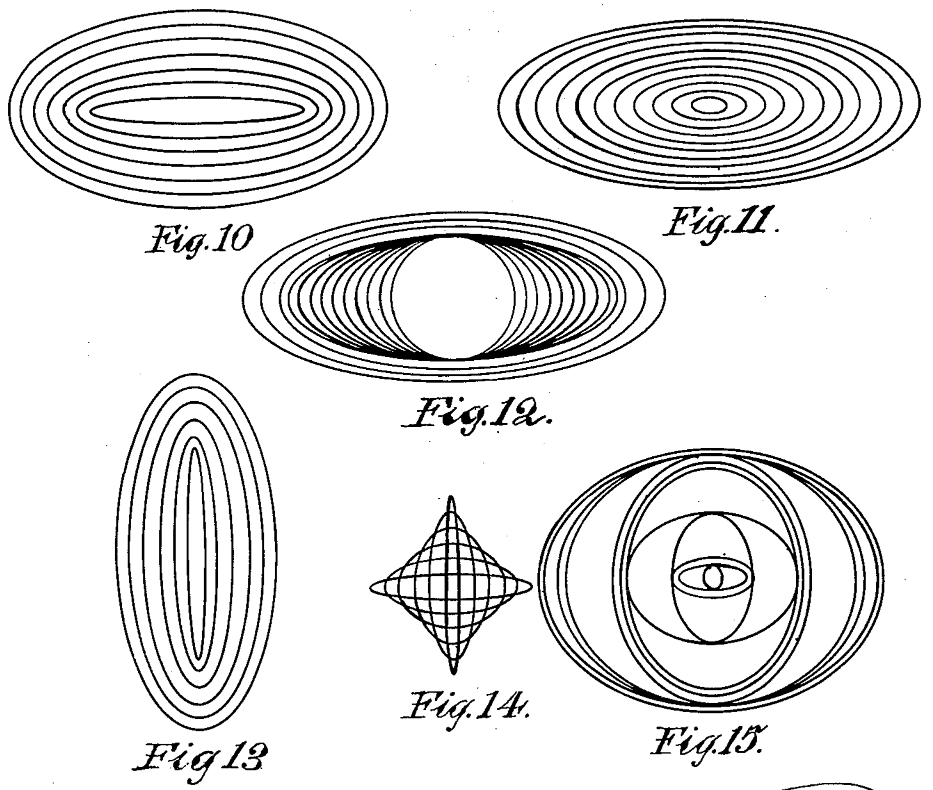
Figure 10 is a sample drawing of a series of ellipses in which the difference between the X-semiprincipal axis and the Y-semiprincipal axis is constant and positive, i. e., $a-b=0.73''$.
Figure 11 is a sample drawing of a series of concentric ellipses in which $a/b=2.55$.
Figure 12 is a sample drawing of a series of concentric ellipses in which $a/b$ is constant for the first three outside members, $a-b$ is constant for the third and fourth members, and $b$ is constant for the fourth through the thirteenth members, inclusive.
Figure 13 is a sample drawing of a series of concentric ellipses in which $a-b=-0.73''$.
Figure 14 is a sample drawing of a series of concentric ellipses in which $a+b=0.73''$ for all members.
Figure 16:
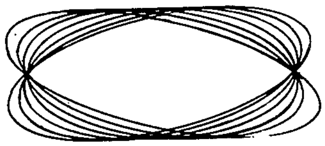
Figure 17:
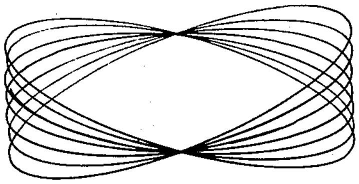
Figure 18:
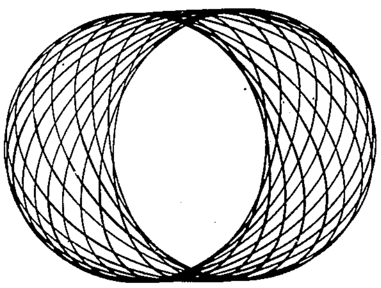
Figure 19:
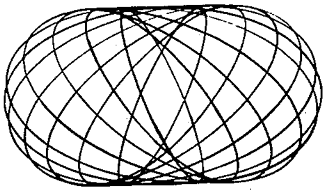
Figures 20, 21, 22:
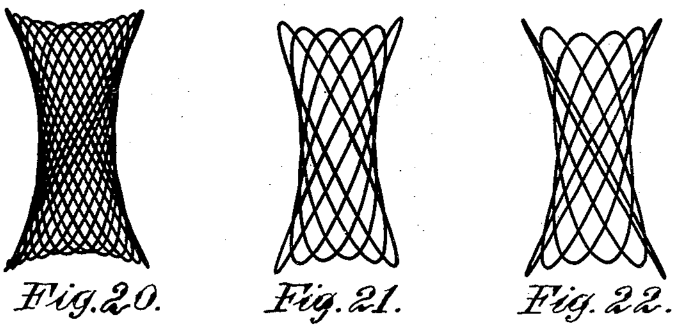
Figures 23, 24, 25, 26, 27, 28, 29, 30, 31, 32, 33:
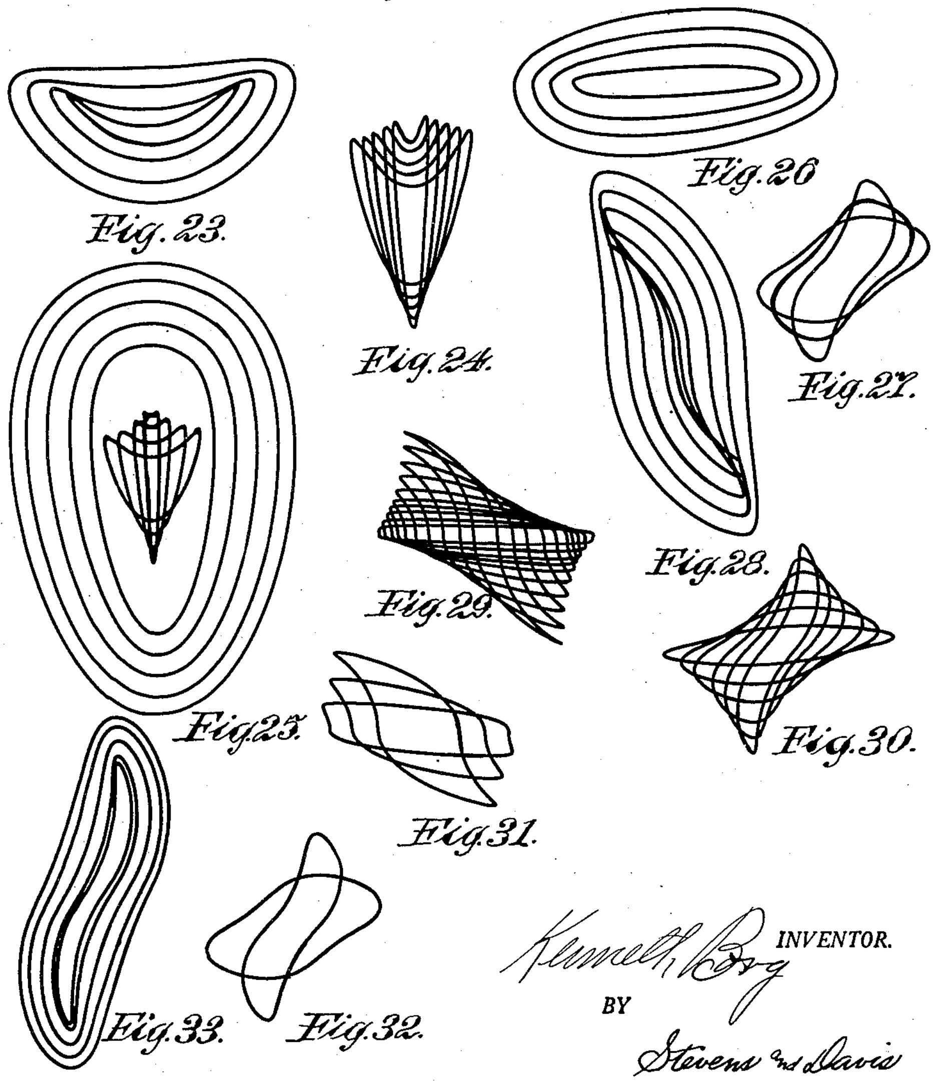
Figure 34:
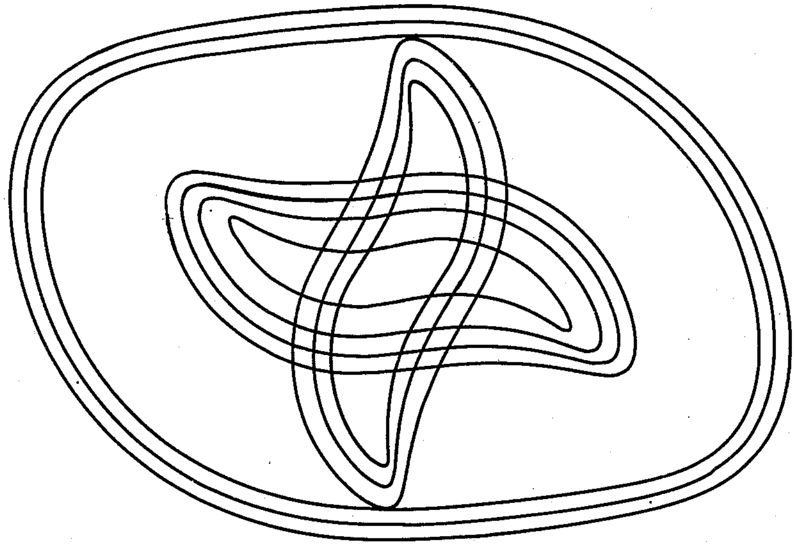
Figures 35, 36:
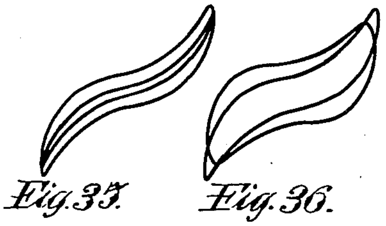
Figure 37:
Figure 38:
Figure 40:
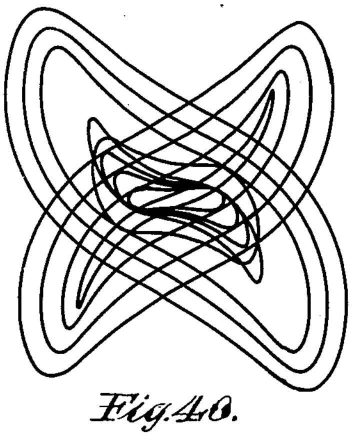
Figure 39:
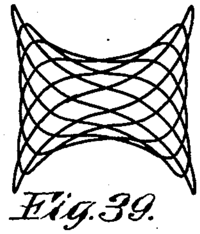
Figure 41:
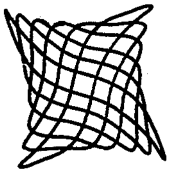
Figure 42:
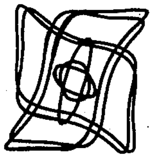

Figure 15 is a sample drawing of a series of concentric ellipses in which $a-b$ is constant for the two outside members; $b$ is constant for the second through the fifth members; $a-b$ is constant and negative for the fifth through the seventh members; the major axis of the ninth member equals the minor axis of the eighth member; the major axis of the tenth member equals the minor axis of the ninth member; $a-b$ for the tenth and eleventh members is constant; and the major axis of the twelfth member equals the minor axis of the eleventh member;

Figure 16 is a sample drawing of a series of concentric ellipses, all members of which have one diameter in common and are all tangent to two parallel lines equidistant from and parallel to that common diameter, the perpendicular distance between the two parallel lines being less than their common diameter;

Figure 17 is a sample drawing of a series of concentric ellipses, all members of which have one diameter in common and are all tangent to two parallel lines equidistant from and parallel to that common diameter, the perpendicular distance between the two parallel lines being greater than their common diameter;

Figures 18 and 19 are sample drawings of two series of concentric ellipses, each member of which, in each figure, is tangent to two equal eccentric intersecting circles (circles not shown, but clearly indicated), and to their two common tangents;

Figures 20, 21 and 22 are sample drawings of a series of ellipses, each member of which is tangent to the four branches of two intersecting hyperbolas, each of which is symmetrical about the same two perpendicular axes;

Figures 23, 24 and 25, are all sample drawings of quartic loci and representative of oblique projections of cylindrical surface intersections;

Figures 26 through 42, inclusive, are all sample drawings of isomorphic families of curves of higher orders in even powers. None of the members is symmetrical about any axis, but any line drawn through their centers of gravity bisects them into two equal parts; and Figure 43 represents a mathematical construction by which certain mathematical properties of the device will be proved hereinafter in the specification.

The analytical expressions for all curves included herewith are known. The analytical expressions for any curve whatsoever described by my mechanism become immediately known if the typing guides used to draw that curve are expressible as $y_1=f(x_1)$ and $y_2=\phi(x_2)$, by substituting into a solution of the general plane curve given later herein and supplying the coefficients therein from readings on the various adjustments.

All figures, except Figures 8, 9, 12 and 15, were made by using a single adjustment from curve member to curve member within each pattern; and only two adjustments were used in Figures 8, 9, 12 and 15.

For brevity, I limit my exhibits and discussion to these few common examples of the uses to which draftsmen can put my invention; but do not thereby concede by such abridgment any limitation whatsoever in these specifications, claims, or use of the mechanism for any trade or other model, and in particular to the exclusive right to furnish other curve typing guides for use with my invention separately as accessory thereto either as a stock article or a specification requirement.

The fastening 1 is secured by bolts or screws to suitable anchorage, or the longitudinal dovetail groove in the fastening 1 fits onto a drafting machine scale, T-square, parallel line ruler, or other mechanism. The transverse dovetail groove in the fastening 1 receives the dovetail tongue on the vernier plate 3 which is regulated for rectilinear position by the thumbscrew 2. Stud bolts 5 and 6 screw into the vernier plate 3, and slip through a circular arc slot and a drilled hole respectively in the limb plate 4, which can then be oriented horizontally about the stud 6 as a center while the slotted arc moves around the stud 5. At desired horizontal orientation, the thumbnuts 7 and 9 are tightened on studs 5 and 6, respectively, thus holding a desired relative orientation between the limb-plate 4 and vernier plate 3.

The two feet 8, 8 screw onto the frame posts 11, 11 which screw into the nuts 10, 10, slip through holes in the lower frame member 30, screw through the spreader nuts 12, 12, slip through holes in the upper frame member 16, and are tightened by the thumbnuts 13, 13. The thumbnut 14 and the interiorly and exteriorly threaded bushing 15 screw into the frame plates 16 and 30, respectively, and into each other; and are used to adjust the frame plates 30 and 16 to parallelism. The four screws 17 secure the $f(x_1)$-curve typing guide plate 18 to the ring 21 which can be oriented on a shoulder in a circular hole in the upper frame plate 16, and can be held at any desired orientation by the two setscrews 22 or by friction; four other screws 17 securing the $\phi(x_2)$-curve typing guide plate 31 to the ring 29 which can be oriented on a shoulder in a circular hole in the lower frame plate 30, and can be held at any desired orientation by two setscrews or by friction.

Figures 1, 2, 3, 5, 6, 7:
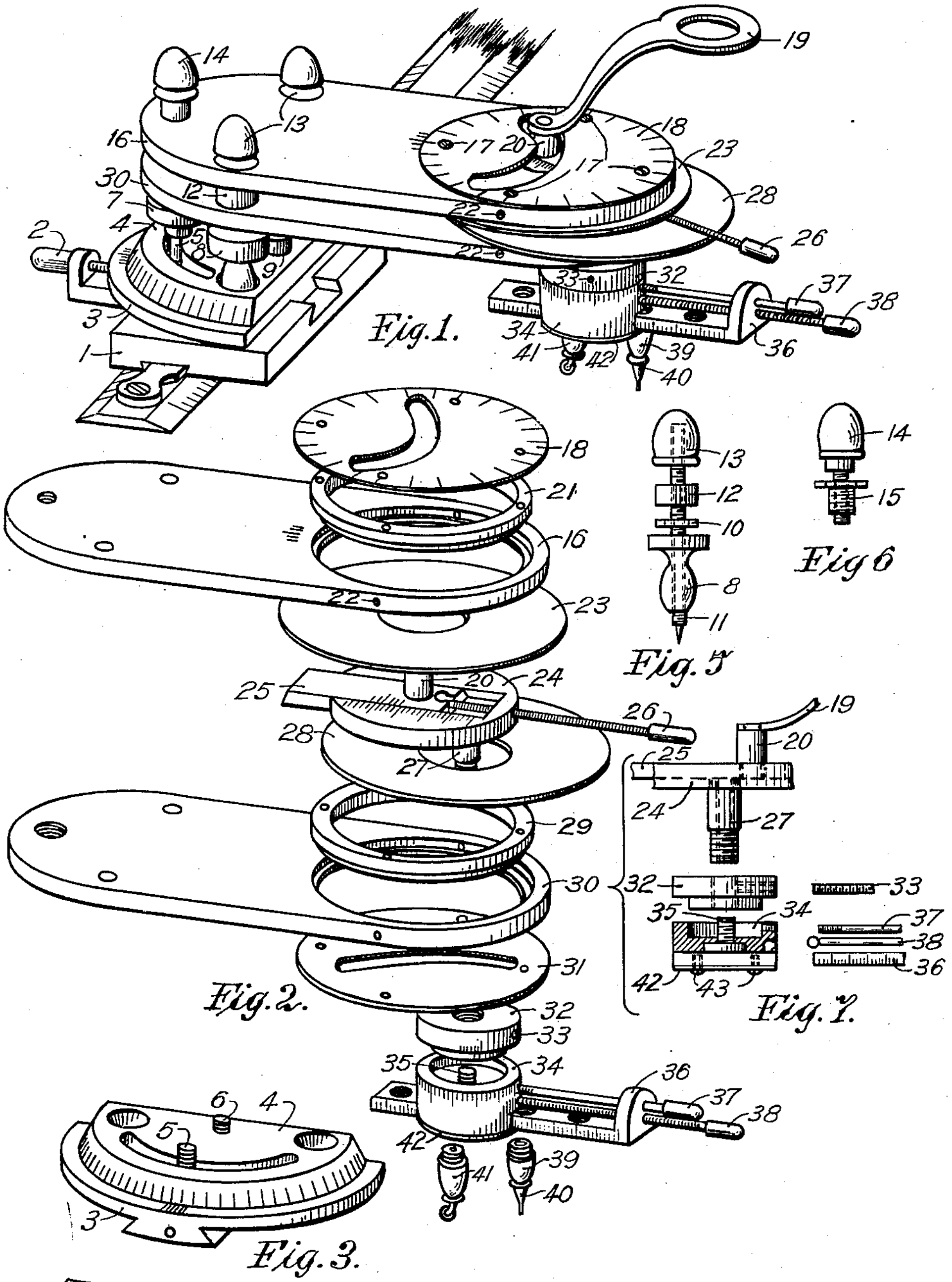
Figure 2 is an expanded dimetric drawing showing how the various parts are put together to form the frame and how the moving mechanism is retained by the frame and constrained by slots in the curve typing guide plates.
Figure 3 is a detail view of the vernier plate and limb plate which serve to support the frame posts at two points and to orient the frame and move the frame in a rectilinear manner.
Figure 5 is a detail view of one of two frame posts for binding the frame together and supporting the frame.
Figure 6 is a detail view of an interiorly and exteriorly threaded bushing and thumb nut for adjusting the main frame plates to parallelism.
Figure 7 is a detail view intended to show, part in elevation and part in section, the manner in which the moving, tool-carrying mechanism is assembled.
Figure 4:
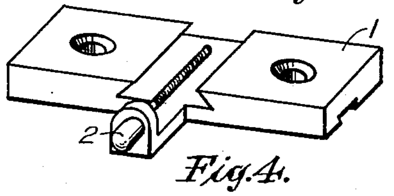
Figure 4 is a detail view of the fastening for attaching the vernier plate with screws to a suitable object or to a drafting machine by means of the longitudinal dovetail groove underneath and to allow rectilinear motion of the frame.
Figure 8:
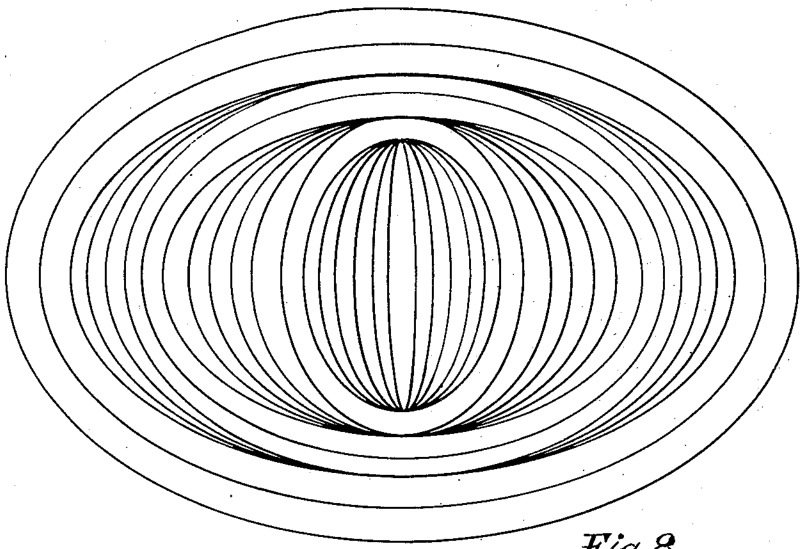
Figures 8 and 9 are sample drawings intended to show the approximate maximum range at which my mechanism as herein recommended for use by draftsmen, affords accuracy; and to indicate some of the isomorphic series which can be accomplished by a single adjustment from one curve member to the next member in the series.

When adjusted to operate in connection with the drafting machine, the thumbnuts 8 are screwed downward on the posts 11 so that these little points are not exposed below the thumbnuts 8; that is, they are inside the thumbnuts 8 where they will not grind or scratch against the plate 3. However, not all draftsmen have access to a drafting machine. Under these circumstances the parts shown in Figures 3 and 4 are not convenient to use. Accordingly, in such instances, I dispense with the parts shown in Figures 3 and 4, screw up the thumbnuts 8 on the posts 11, and allow the little points to stick into the drafting board so that the position and orientation of the instrument can be maintained at will, or so that the instrument can be placed back in that position, if removed, by simply placing the points on the posts 11 back in the holes previously punctured in the drafting table.

The handle 19 screws onto the guide post 20 which slips through the slotted channel in the $f(x_1)$-curve typing guide plate 18, through the ring 21, and through a hole in the floating disc 23, and screws into the $(a-b)$-vernier slide 25, which can be moved in a dovetail groove in the graduated disc 24 by means of a thumbscrew 26 threaded through the disc 24, and attached by ball and socket to the slide 25.

The guide post 27 slips through the $\phi(x_2)$-curve typing guide plate 31, through the ring 29, through a hole in the floating disc 28, and screws into the graduated disc 24. The Υ-vernier plate 32 is screwed onto the lower end of the guide post 27, which is drilled and tapped inside to receive the retaining screw 35 which is slipped through a hole in the center of the Υ-limb member 34, screwed into the guide post 27, and set at running fit by the setscrew 33. The Υ-limb member 34 retains the graduated tool bar 36 in a rectangular slot by means of two circular segments 42 of thin plate screwed to 34 by the screws 43. The tool bar 36 is regulated for rectilinear position by the thumbscrew 38, and held at any angle with respect to the Υ-vernier plate 32 by the thumbscrew 37 which slips through a hole in the tool bar 36, screws through the lip of the limb member 34 and binds against the Υ-vernier member 32.

At convenient intervals along its length the tool bar 36 is drilled and tapped to receive the tool adapter 39 and/or the spring castor 41. The tool 40 is attached to the tool adapter 39 by machine screw thread, swivel joint, or other appropriate connection suitable to the tool being used and the type of work being done. For example: In drafting with pen or pencil, a machine screw connection is convenient; the adapter can then be an ink well or a lead holder, and the castor 41 can be dispensed with. If acetylene cutting is being done, the connection is a chuck and swivel to keep rotation from twisting the gas hose. In directing the tracing point of a pantograph or planimeter, the connection is also a swivel. If used to cut stencils or masks, used in commercial artistry, the best tool is a cutting edge with machine screw connection when Υ is near zero and $b$ is positive; but when Υ is near $\pi$ and $b$ is less than $(a+b)$, the cutting tool is a sharp or toothed wheel and the connection a swivel. Thus the best kind of connection between the tool and the adapter is obviously a matter which the operator must decide according to the job being done.

As the handle 19 is moved, it impels the post 20 to move along and rotate in the slot in the curve-typing guide 18 and impels the disc-shaped assembly 24 and 25 held together with the thumbscrew 26 to slide between the floaters 23 and 28 which floaters slide between the frame members 16 and 30 while the post 27, rigidly affixed to 24, thereby impelled to move along and rotate within the slot in the curve-typing guide 31, carries the vernier plate 32, the limb 34, the tool-carrying bar 36, the castor 41, the tool adapter 39, and the tool 40, together with the fastening and adjusting screws 33, 35, 37 and 38 as a unit, in such a manner that the tool 40 describes any plane curve.

To prove that such curve is general, reference is made to Figure 43:

Let the vertical projections upon the horizontal XY plane of the vertical axis of the post 20, the vertical axis of the post 27, and the vertical center line of the tool 40 be the vertices of any plane triangle ABC, respectively, as shown in Figure 43. Let the sum of the two sides AB and BC be equal to a length $a$ and let the side BC be equal to a length $b$; then the side $AB=a-b$. Let the exterior angle at B, measured in a counterclockwise direction from AB produced to BC, be called $\Upsilon$. Let $y_1=f(x_1)$ and $y_2=\phi(x_2)$ be any two loci whatever in the XY plane of rectangular Cartesian coordinates, upon which plane the vertices of the triangle ABC were projected. Let the triangle ABC move so that its vertex A moves along the locus $y_1=f(x_1)$, and the vertex B moves along the locus $y_2=\phi(x_2)$. Then the vertex C will move along some locus which I call $y=\psi(x)$. If tan $\theta$ be the slope of the side AB, then the following relations obtain:

$$y_1=f(x_1) \quad (1)$$
$$y_2=\phi(x_2) \quad (2)$$
$$y_1=y-(a-b)\sin\theta-b\sin(\Upsilon+\theta) \quad (3)$$
$$y_2=y-b\sin(\Upsilon+\theta) \quad (4)$$
$$x_1=x-(a-b)\cos\theta-b\cos(\Upsilon+\theta) \quad (5)$$
$$x_2=x-b\cos(\Upsilon+\theta) \quad (6)$$

Eliminating the subscripts:

$$f[x-(a-b)\cos\theta-b\cos(\Upsilon+\theta)]=y-(a-b)\sin\theta-b\sin(\Upsilon+\theta) \quad (7)$$

and $$\phi[x-b\cos(\Upsilon+\theta)]=y-b\sin(\Upsilon+\phi) \quad (8)$$

are the parametric equations of the locus $y=\psi(x)$.

Since $y_1=f(x_1)$ and $y_2=\phi(x_2)$ are both entirely general plane curves, it is obvious that if $b=0$ and $\Upsilon=0$, then the point C will move along $y_2=\phi(x_2)$. Since the locus $y_2=\phi(x_2)$ is entirely general, and the locus $y=\psi(x)$ becomes the same locus as $y_2=\phi(x_2)$ regardless of the locus $y_1=f(x_1)$, then $y=\psi(x)$ is entirely general.

Likewise if $a=2b$ and $\Upsilon=\pi$, then $y=\psi(x)$ becomes the same locus as $y_1=f(x_1)$ which is also entirely general.

If then, it be required to design guide plates 18 and 31 which will cause the tool to describe the locus $y=\psi(x)$, an arbitrary choice of either, but not both, of the loci $y_1=f(x_1)$ and $y_2=\phi(x_2)$ is optional at the outset. It is usually better to make this choice from a consideration of the mathematics then at random, because it often leads to a simpler guide design that will serve for describing a useful series of isomorphs as well as the specific locus $y=\psi(x)$, the primary purpose. However, this method does not recognize kinematic weaknesses which often result from its use. Recourse to change in choice of $y_1=f(x_1)$ or $y_2=\phi(x_2)$, or modifications, will often restore kinematic strength; but may destroy the advantages of a more general use of the guide design. As thus seen, the making of guide plates to meet a specification must necessarily be directed by familiarity with the underlying theory whenever best results warrant the expense or delay required by systematic designing which is difficult as a rule. However, if a graph of the required locus $y=\psi(x)$ is at hand, guide plates can be improvised by the mechanism itself, as follows:

Choose the guide plate 18, $y_1=f(x_1)$ at random and attach it in place. Put one tool adapter 39 carrying a marking point in the tool-carrying bar 36 and adjust the axis of this adapter into the axis of post 27. Put another tool adapter carrying a tracing point in one of the accessory holes in 36. Arrange the mechanism over the graph and vary its adjustments until the tracing point can be run over the graph $y=\psi(x)$. The marking point will then describe the locus $y_2=\phi(x_2)$. Or, choose the guide plate 31, $y_2=\phi(x_2)$ at random and attach it in place. Take off the handle 19, remove the post 20, and screw a tool adapter carrying a marking point directed upward in its place. Attach a sheet of material suitable for making a pattern in the place of the upper guide plate 18, $y_1=f(x_1)$, so that it contacts the upward-pointing marking point. Place the graph of the locus $y=\psi(x)$ underneath the mechanism and adjust so that a tracing point in the tool bar 36 can follow the locus $y=\psi(x)$ on the graph. Use the tool bar 36 as a handle and move it so that the tracing point moves over the locus $y=\psi(x)$. Then the upward-pointing marking point will mark out the required pattern for $y_1=f(x_1)$. Either of these procedures can be used to mark out patterns for guide plates; but a little experience, instruction, or the use of at least a few simple rules are desirable, both for the sake of kinematic strength and utilization of the machine's full capacity. At first, one will find it difficult to design guides which stay within the range of the rings 21 and 29, in which case it will sometimes be found expedient to use guide plates several times the diameter of those shown in the drawings, and possibly much thicker to lend rigidity. In such case, the order of assembly is a little different. The guide plate 18 then is secured to the lower side of the ring 21 and the guide plate 31 to the upper side of ring 29; the spreader nuts 12, 12 are shimmed to accommodate the added distance between the frame plates 16 and 30 and the bushing 15 adjusted thereto. Either or both of the posts 20 and/or 27 can then operate in slots inside or outside the rings 21 and 29, respectively. To further increase the range I have resorted to other expedients such as cutting sections out of the frame plates 16 and 30, and out of the rings 21 and 29 so that the posts 20 and 27 can pass through these removed sections in grooves in the guide plates 18 and 31, respectively from inside to outside the rings 21 and 29, and vice versa. I have reversed the slide 25 in the dovetail groove in 24 and provided a socket at the reverse end of 25 to engage the balled thumbscrew 26 as a convenience in setting off larger horizontal distances between the vertical axes of the posts 20 and 27. I have used longer posts 27 than that indicated so that the tool can pass underneath an elevated or overhead positioned of the fastening 1. This is particularly advantageous in heavy industrial models. In some models I have graduated the frame members 16 and 30 instead of the guide plates 18 and 31. I have used a ball race instead of the sliding disc 24. I have used graduated micrometer heads on the thumbscrews 2, 26 and 38. I have used a disengaging nut on the tool carrying bar 36 to let it be quickly moved to the approximate required position before using the slow motion thumbscrew 38 to adjust to precise position. In my draftsman's trammel, I sometimes use a rubber band looped around the thumb nuts 13 and/or 14 and underneath the fastening 1 as a satisfactory means of holding the body securely, and quickly removing and replacing it on the limb plate, and for relieving the weight on the pen (the third point of support), so that the castor 41 can usually be dispensed with. Heavier models as used in industry require a spring and turnbuckle between the nut 14 and the fastening 1, instead of a rubber band. In my trammels for draftsmen and commercial artists, I have found that transparent guide plates 18 and floaters 23 are of some advantage when reading the vernier and scale on 24 and 25. By using sufficiently rigid and sturdy material in guide plates 18 and 31, I have found it practicable to cut the guide grooves through one edge of the guide plates 18 and 31, so they can be removed and replaced without taking off the handle or that part of the tool carrying mechanism below and including the vernier plate 32. I can do overhead work in industry by replacing the handle with an inverted assembly of the parts 32 to 43, inclusive, in which the tool points upwardly. In this position the range of the tool 40, or other parts, is never restricted by the fastening 1. In acetylene cutting, overhead work offers the advantage of being able to use a castor 41 in its regular position without twisting around the gas hoses and the work can be run overhead on a suitable carrier. Guide plates designed for drawing isomorphic Cassinian ovals of double loop series, lemniscates, and other curves of two loops symmetrical in the four quadrants require curved grooves which are alike but lie at 180° difference in orientation when in use and cross their common axis of symmetry at the same or different points on that axis. To allow adjustment between these points of intersection of the curved grooves with their common axis of symmetry I have used rectangular guide plates 18 and 31 in which the holes which receive the screws 17 are elongated into slots parallel to that axis. For quick changing from one fixed position to another, I have used a rectilinear series of holes instead of elongated slots, and U-shaped recesses in the edges of the guide plates 18 and 31 for receiving the screws 17.

For reproducing intricate curves or patterns, I use a much larger lower guide plate 31, bored with a hole of the same diameter as the post 27 so that only rotation of the post 27 can occur; replace the tool carrying bar 36 with a much longer bar which can slide freely in the rectangular slot of 34; and I dispense with the thumbscrews 37 and 38. I put an adapter with a fine tracer point in the tool bar 36 near one end and near the post 27, and an upward marking point near the other end. I move the tool bar so that the tracer point follows the pattern. Then the marking point describes a curve on the guide plate 31. I cut out a slot along this curve only wide enough to admit the marking point. Then when I move the marking point in the slot the tracer point reproduces the original curve or pattern. This last method does not utilize the kinematics of a true trammel; but the mathematics given already cover the kinematics by defining $y_1=f(x_1)$, thus $$x_1^2+y_1^2=0$$

a point circle in the axis of the post 27, and $y=\psi(x)$ is still entirely general.

What is claimed is:

1. In a tool guide device of the type described, a frame, a circular member having a slot mounted in said frame so as to be rotatable, means for locking said circular member against rotation, a pin mounted in the slot in said circular member so as to be movable along said slot, a second pin attached by attaching means to said first pin and having its axis parallel thereto, said attaching means including means to vary the distance between the axes of the two pins, a second circular member having a slot and mounted in said frame so as to be rotatable and also so as to receive said second pin in its slot, means to lock said second circular member against rotation, and a tool holder mounted on said second pin, said tool holder including means to adjust the distance between the tool and the axis of the second pin and means for adjusting the angular alignment of the tool with respect to a line joining the axes of the pins, whereby the distance between the tool and the first pin may be adjusted independently of the spacing between the two pins and the spacing between the second pin and the tool.

2. In a tool guiding device of the type described, a frame, attaching means for attaching said frame to a support, said attaching means including a pivotable connection so that said frame may be rotated with relation to said support, and means to lock said pivotable connection to lock said frame in any desired angular position with relation to said support; a circular member having a slot mounted in said frame so as to be rotatable, means for locking said circular member against rotation, a pin mounted in the slot in said circular member so as to be movable along said slot, a second pin attached by attaching means to said first pin and having its axis parallel thereto, said attaching means for the second pin including means to vary the distance between the axes of the two pins, a second circular member having a slot and mounted in said frame so as to be rotatable and also so as to receive said second pin in its slot, means to lock said second circular member against rotation, and a tool holder mounted on said second pin, said tool holder including means to adjust the distance between the tool and the axis of the second pin.

3. In a tool guiding device of the type described, a frame, attaching means for attaching said frame to a support, said attaching means including a pivotable connection so that said frame may be rotated with relation to said support, and means to lock said pivotable connection to lock said frame in any desired angular position with relation to said support; said attaching means being comprised of rectilinearly relatively slidable parts so that said frame may be moved linearly on said support, and means for controlling the linear movement of said frame relative to said support; a circular member having a slot mounted in said frame so as to be rotatable, means for locking said circular member against rotation, a pin mounted in the slot in said circular member so as to be movable along said slot, a second pin attached by attaching means to said first pin and having its axis parallel thereto, said attaching means for the second pin including means to vary the distance between the axes of the two pins, a second circular member having a slot and mounted in said frame so as to be rotatable and also so as to receive said second pin in its slot, means to lock said second circular member against rotation, and a tool holder mounted on said second pin, said tool holder including means to adjust the distance between the tool and the axis of the second pin.

4. In a tool guiding device of the type described, a frame, a circular member having a slot mounted in said frame so as to be rotatable, means for locking said circular member against rotation, a pin mounted in the slot in said circular member so as to be movable along said slot, a second pin attached by attaching means to said first pin and having its axis parallel thereto, said attaching means including means to vary the distance between the axes of the two pins, a second circular member having a slot and mounted in said frame so as to be rotatable and also so as to receive said second pin in its slot, means to lock said second circular member against rotation, a tool holder mounted on said second pin, said tool holder including means to adjust the distance between the tool and the axis of the second pin, and floating washers between said attaching means and each of said circular members.

5. In a tool guiding device of the type described, a frame, a circular member having a slot mounted in said frame so as to be rotatable, means for locking said circular member against rotation, a pin mounted in the slot in said circular member so as to be movable along said slot, an operating handle on said pin, a second pin attached by attaching means to said first pin and having its axis parallel thereto, said attaching means including means to vary the distance between the axes of the two pins, a second circular member having a slot and mounted in said frame so as to be rotatable and also so as to receive said second pin in its slot, means to lock said second circular member against rotation, and a tool holder mounted on said second pin, said tool holder, including means to adjust the distance between the tool and the axis of the second pin.

6. In a tool guiding device of the type described, a frame, a plurality of downwardly extending members for holding said frame in position on a support, a circular member having a slot mounted in said frame so as to be rotatable, means for locking said circular member against rotation, a pin mounted in the slot in said circular member so as to be movable along said slot, a second pin attached by attaching means to said first pin and having its axis parallel thereto, said attaching means including means to vary the distance between the axes of the two pins, a second circular member having a slot and mounted in said frame so as to be rotatable and also so as to receive said second pin in its slot, means to lock said second circular member against rotation, and a tool holder having attached thereto a tool mounted on said second pin, said tool holder including means to adjust the distance between the tool and the axis of the second pin.

7. In a tool guiding device, a pair of pivot pins, a first telescoping means for supporting said pins in parallel, oppositely extending relationship, the components of said telescoping means having registering plane surfaces bearing registering indicia, said telescoping means including means to adjust the distance between the pins, a tool, a second telescoping means for connecting said tool to one of said pins in parallel, oppositely extending relationship, said second telescoping means including means to adjust the distance between the tool and pin, a supporting frame including spaced slotted members for guiding the pins and for receiving the first telescoping means therebetween, and means for adjusting the angular alignment of the tool with respect to a line joining the axes of the pins, whereby the distance between the tool and the first pin may be adjusted independently of the spacing between the two pins and the spacing between the second pin and the tool.

8. In a tool guiding device, a pair of pivot pins, a first telescoping means for supporting said pins in parallel, oppositely extending relationship, the components of said telescoping means having registering plane surfaces bearing registering indicia, said telescoping means including means to adjust the distance between the pins, an operating handle attached to one of said pins, a tool, a second telescoping means for connecting said tool to the other of said pins in parallel, oppositely extending relationship, said second telescoping means including means to adjust the distance between the tool and pin, a supporting frame including spaced slotted members for guiding the pins and for receiving the first telescoping means therebetween, means for setting and holding each of said telescoping means in any position of adjustment, and means for adjusting the angular alignment of the tool with respect to a line joining the axes of the pins, whereby the distance between the tool and the first pin may be adjusted independently of the spacing between the two pins and the spacing between the second pin and the tool.

9. In a tool guiding device, a pair of pivot pins, a first telescoping means for supporting said pins in parallel, oppositely extending relationship, said telescoping means including means to adjust the distance between the pins, a tool, a second telescoping means for connecting said tool to one of said pins in parallel, oppositely extending relationship, said second telescoping means including means to adjust the distance between the tool and pin, and a supporting frame including spaced slotted members for guiding the pins and for receiving the first telescoping means therebetween, at least one of said members being marginally supported by a portion of the frame for rotation with respect thereto.

10. A tool guiding device as defined in claim 6, wherein said plurality of downwardly extending members comprise two members attached to and depending from the frame to support the frame in such manner as to prevent horizontal angular rotation thereof and one member attached to and depending from the tool holder for maintaining contact of the tool with the surface on which the work is being done.

KENNETH BORG.

REFERENCES CITED

The following references are of record in the file of this patent:

UNITED STATES PATENTS

| Number | Name | Date |
|---|---|---|
| 181,725 | Root | Aug. 29, 1876 |
| 1,029,515 | Schreiber | June 11, 1912 |
| 1,299,006 | Muller | Apr. 1, 1919 |

FOREIGN PATENTS

| Number | Country | Date |
|---|---|---|
| 78,015 | Germany | Nov. 20, 1894 |